:

US007602886B1

(12) United States Patent
Beech et al.

(10) Patent No.: US 7,602,886 B1
(45) Date of Patent: Oct. 13, 2009

(54) METHOD AND SYSTEM FOR USING A NETWORK-PROVIDED LOCATION FOR VOICE-OVER-PACKET EMERGENCY SERVICES CALLS

(75) Inventors: Hal S. Beech, Olathe, KS (US); Douglas R. Green, Lenexa, KS (US); Shingara S. Dhanoa, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 740 days.

(21) Appl. No.: 11/185,094

(22) Filed: Jul. 20, 2005

(51) Int. Cl.
*H04M 11/00* (2006.01)
(52) U.S. Cl. .......................................... 379/45; 379/37
(58) Field of Classification Search .................... 379/45, 379/37, 38–44, 46–51; 370/352
See application file for complete search history.

(56) References Cited

U.S. PATENT DOCUMENTS

| | | | |
|---|---|---|---|
| 6,427,001 B1 | 7/2002 | Contractor et al. | |
| 6,570,974 B1 | 5/2003 | Gerszberg et al. | |
| 6,650,901 B1 * | 11/2003 | Schuster et al. | ............... 379/45 |
| 6,665,611 B1 | 12/2003 | Oran et al. | |
| 6,678,357 B2 | 1/2004 | Stumer et al. | |
| 6,744,859 B1 | 6/2004 | Koepke et al. | |
| 6,771,742 B2 | 8/2004 | McCalmont et al. | |
| 7,042,985 B1 * | 5/2006 | Wright | ........................ 379/45 |
| 2003/0109245 A1 | 6/2003 | McCalmont et al. | |
| 2004/0057425 A1 | 3/2004 | Brouwer et al. | |
| 2004/0184584 A1 | 9/2004 | McCalmont et al. | |
| 2004/0190497 A1 | 9/2004 | Knox | |
| 2004/0192271 A1 | 9/2004 | Eisner et al. | |
| 2005/0020241 A1 | 1/2005 | Holland et al. | |
| 2005/0020242 A1 | 1/2005 | Holland et al. | |
| 2005/0020280 A1 | 1/2005 | Holland et al. | |
| 2005/0020281 A1 | 1/2005 | Holland et al. | |
| 2005/0026589 A1 | 2/2005 | Holland et al. | |
| 2005/0083911 A1 | 4/2005 | Grabelsky et al. | |
| 2005/0111630 A1 | 5/2005 | Potorny et al. | |
| 2005/0174991 A1 * | 8/2005 | Keagy | ........................ 370/352 |
| 2005/0213716 A1 * | 9/2005 | Zhu et al. | ...................... 379/45 |
| 2006/0072547 A1 * | 4/2006 | Florkey et al. | ............... 370/352 |
| 2006/0193446 A1 * | 8/2006 | Colunga | ....................... 379/45 |
| 2006/0281437 A1 * | 12/2006 | Cook | ........................... 379/45 |
| 2007/0003024 A1 * | 1/2007 | Olivier et al. | .................. 379/45 |

OTHER PUBLICATIONS

Schulzrinne, Internet Draft, "Providing Emergency Call Services for SIP-based Internet Telephony," Jul. 13, 2000.

(Continued)

*Primary Examiner*—Stella L Woo (57) ABSTRACT

A client device transmits, via a voice-over-packet (VoP) access network, a message that requests an emergency services call. An outbound proxy server receives the message and obtains a network-provided location of the client device, e.g., by looking up the source address of the message in a location database maintained by the access network or by invoking an active network location function. The outbound proxy server inserts the network-provided location into the message, leaving any client-provided location in the message undisturbed, and forwards the message to an emergency services routing server. The emergency services routing server determines which public safety answering point (PSAP) should receive the call, based on at least one of the network-provided location and any client-provided location in the message.

19 Claims, 5 Drawing Sheets

OTHER PUBLICATIONS

M. Patrick, Request for Comments 3046, "DHCP Relay Agent Information Option," Jan. 2001.

H. Schulzrinne, Request for Comments 3361, "Dynamic Host Configuration Protocol (DHCP-for-IPv4) Option for Session Initiation Protocol (SIP) Servers," Aug. 2002.

H. Schulzrinne, Request for Comments 3319, "Dynamic Host Configuration Protocol (DHCPv6) Options for Session Initiation Protocol (SIP) Servers," Jul. 2003.

H. Schulzrinne, Internet Draft, "Emergency Services URI for the Session Initiation Protocol," Feb. 8, 2004.

H. Schulzrinne, Internet Draft, "Emergency Services for Internet Telephony Systems," Oct. 18, 2004.

Avaya, Inc., "Comments on IP Telephony Support for Emergency Calling Service," TR 41.4.1/01-08-002, Jul. 25, 2001.

J. Polk et al., Request for Comments 3825, "Dynamic Host Configuration Protocol Option for Coordinate-based Location Configuration Information," Jul. 2004.

Cisco Systems, Inc., "Cisco Emergency Responder Version 1.2 (2)", Data Sheet, Sep. 2004.

Donny Jackson, "Nortel proposes VoIP 911 solution," *Mobile Radio Technology*, May 1, 2004.

"How VOIP E911 might work," Vonage™ VoIP Forum, Mar. 2005.

Texas A&M University, Internet2 Technology Evaluation Center, "NG 911 Project," Mar. 29, 2005.

Brad Templeton, "DHCP Option for street address, PSAP for VoIP E911," Brad Ideas, May 2, 2005.

H. Schulzrinne, Internet Draft, "Requirements for Emergency Context Resolution with Internet Technologies," May 5, 2005.

* cited by examiner

METHOD AND SYSTEM FOR USING A NETWORK-PROVIDED LOCATION FOR VOICE-OVER-PACKET EMERGENCY SERVICES CALLS

BACKGROUND

1. Field of the Invention

The present invention relates to telecommunications and, more particularly, to methods and systems for using a client device location that is provided by an access network for routing an voice-over-packet (VoP) emergency services call from the client device to an appropriate public safety answering point (PSAP).

2. Description of Related Art

The ability to place an emergency services call by dialing 9-1-1 has become widespread throughout the United States. When a 9-1-1 call is placed, it is typically answered at a PSAP. However, there are many PSAPs throughout the United States, each serving a particular area, such as a city, county, or metropolitan area. The public switched telephone network (PSTN) can route a 9-1-1 call to the appropriate PSAP, i.e., the PSAP that servers the caller's area, because the caller's telephone number is associated with a fixed location. The PSAP can also reliably determine the caller's location based on the caller's telephone number.

Increasingly, however, packet networks are being used for voice communications, including emergency services calls. Such voice-over-packet (VoP) networks often route calls that are placed by client devices that can change their point of connectivity to the network. Because of this mobility, client devices and their associated telephone numbers may not be reliably associated with fixed locations. Even so, it is desirable for a user of a client device to be able to dial 9-1-1 from any location and have the call routed through the VoP network to the appropriate PSAP, i.e., the PSAP that serves the user's current location. In addition, it is desirable for the PSAP that answers the call to be able to reliably determine the caller's location, e.g., in order to dispatch assistance to the caller.

Accordingly, there is a need for providing methods and systems for obtaining location information that can be relied upon to route an VoP emergency services call to the appropriate PSAP and to inform the PSAP of the caller's location.

SUMMARY

In a first principal aspect, an exemplary embodiment of the present invention provides a method for emergency services call routing. In accordance with the method, a message from a client device is received via a voice-over-packet (VoP) access network. The message requests an emergency services call. A network-provided location of the client device is obtained from the VoP access network. The message is checked for any client-provided location of the client device. An appropriate public safety answering point (PSAP) is determined, from among a plurality of PSAPs, based on at least one of the network-provided location and the any client-provided location. The emergency services call is routed to the appropriate PSAP.

In a second principal aspect, an exemplary embodiment of the present invention provides a method for providing location information for emergency services calls. In accordance with the method, an outbound proxy server receives from a client device, via a voice-over-packet access network, a Session Initiation Protocol (SIP) INVITE message. The SIP INVITE message includes a source address. The outbound proxy server determines that the SIP INVITE message is requesting an emergency services call and, responsively, accesses a location database of the VoP access network to obtain a network-provided location of the client device based on the source address. The outbound proxy server inserts the network-provided location into a network-provided location field of the SIP INVITE message.

In a third principal aspect, an exemplary embodiment of the present invention provides a system for providing location information for emergency services calls. The system comprises a voice-over-packet (VoP) access network to which a plurality of client devices are communicatively coupled, a location database that correlates locations of the client devices with source addresses assigned to the client devices, and an outbound proxy server communicatively coupled to the VoP access network so as to receive all initial call requests from the client devices. In response to an emergency services call request from a given one of the client devices, the outbound proxy server obtains from the location database a network-provided location of the given client device and inserts the network-provided location into the emergency services call request.

DETAILED DESCRIPTION OF EXEMPLARY EMBODIMENTS

1. Overview

The present invention, in its exemplary embodiments, provides methods and systems for using location information that is provided by an access network to support a voice-over-packet (VoP) emergency services call, such as a 9-1-1 call, originated by a client device communicatively coupled to the access network. The network-provided location can be used to support the emergency services call in different ways. For example, the network-provided location may be used to determine which public safety answering point (PSAP) is appropriate for answering the call. In particular, the call could be routed to any number of PSAPs. However, different PSAPs typically serve different areas. Thus, the PSAP that is appropriate for answering the call is usually the PSAP that serves the area in which the caller is located. The network-provided location information may also be used to inform the PSAP of the caller's location, for example, in terms of geospatial coordinates (i.e., latitude and longitude) and/or civic coordinates (e.g., a street address). In this way, the PSAP will know where to dispatch emergency assistance.

The network-provided location may also be used to evaluate the reliability of any location information that is provided by the client device. For example, if the network-provided location and the client-provided location are inconsistent, then the network-provided location may be deemed to be more reliable and used to support the emergency services call (e.g., for routing the emergency services call). On the other hand, if the network-provided location and the client-provided location are consistent, and the client-provided location is more specific, then the client-provided location may be used to support the emergency services call.

In an exemplary embodiment, the client device is communicatively coupled to the access network via a network access device, such as a digital subscriber line (DSL) modem, cable modem, or router. The client device could be communicatively coupled to the network access device via a wired connection, such as a local area network (LAN). Alternatively, the client device could be a wireless communication device, such as a wireless handset or wirelessly-equipped laptop computer that communicates with the network access device via a wireless access point, e.g., using an IEEE 802.11x, IEEE 802.16, HiperLAN, HomeRF, Bluetooth, or other wireless communications protocol.

The access network, in turn, provides the client device with access to a wide-area network, such as the Internet. Thus, the access network may be operated by an Internet Service Provider (ISP) to which the user of the client device subscribes. The client device may use the access network for VoP communications and may also use the access network for e-mail, Web browsing, and other applications. In an exemplary embodiment, the client device uses the Session Initiation Protocol (SIP) to set up VoP calls. Thus, to request a VoP call, the client device may transmit a SIP INVITE message. It is to be understood, however, that SIP is exemplary only, as other protocols could be used to set up VoP calls.

In accordance with an exemplary embodiment of the present invention, all initial call requests, such as SIP INVITE messages, transmitted by client devices communicatively coupled to the access network are received by an outbound proxy server that is associated with the access network. The ISP that operates the access network may also operate the outbound proxy server. To ensure that the outbound proxy server receives all initial call requests, the SIP user agents in the client devices may be appropriately configured. This may be accomplished by either a manual configuration process or by a network-based process, such as the Dynamic Host Configuration Protocol (DHCP). Exemplary DHCP-based configuration approaches are described in Schulzrinne, "Dynamic Host Configuration Protocol (DHCPv6) Options for Session Initiation Protocol (SIP) Servers," Request For Comments 3319 (July 2003) and in H. Schulzrinne, "Dynamic Host Configuration Protocol (DHCP-for-IPv4) Option for Session Initiation Protocol (SIP) Servers," Request For Comments 3361 (August 2002), which documents are incorporated herein by reference.

Alternatively, the access network may intercept and divert SIP messages from client devices to the outbound proxy server. For example, the access network may include a policy router that inspects packets from client devices and diverts any packets that appear to be SIP messages to the outbound proxy server. Different schemes could be used for classifying packets as SIP messages. For example, UDP packets directed to port 5060 may be classified as SIP messages.

When the outbound proxy server receives a SIP INVITE message from a client device, the outbound proxy server determines whether the message is requesting an emergency services call. For example, the outbound proxy server may determine whether the message includes an emergency services URI in a destination field. An emergency services URI could, for example, include a designation such as "911" or "sos" that is associated with an emergency services call.

If an emergency services call is being requested, the outbound proxy server tries to obtain information regarding the location of the client device from the access network. Once the outbound proxy server obtains a location from the access network, the outbound proxy server inserts the location into the SIP INVITE message and forwards the modified SIP INVITE message.

How the outbound proxy server obtains the location information from the access network may depend on the particular configuration of the access network and/or on the particular technology the client device is using to communicate with the access network. In one exemplary embodiment, the access network maintains a location database that stores the locations of the client devices that are communicatively coupled to the access network. The locations could be expressed as geospatial coordinates (i.e., in terms of latitude and longitude), and/or in terms of civic coordinates (e.g., a street address). In an exemplary embodiment, the location database correlates the location of each client device with the Internet Protocol (IP) address that has been dynamically assigned to the client device. For example, when a DHCP server of the access network dynamically assigns an IP address to a client device, the DHCP server may also be informed of a hardware element at a fixed location (e.g., a particular circuit or port) that the client device is using to communicate with the access network. This DHCP-based approach is described in Patrick, "DHCP Relay Agent Information Option," Request For Comments 3046 (January 2001), which is incorporated herein by reference. The location database may then store a location for the client device, based on the hardware element's location, and associate that location with the IP address assigned to the client device. Thus, the outbound proxy server can access the location database to determine a client device's location based on the client device's IP address, i.e., the source IP address included in the SIP INVITE message from the client device.

In another exemplary embodiment, the outbound proxy server obtains the location information from the access network by invoking an active network location function of the access network. The active network location function could involve, for example, a wireless triangulation technique and/or network-assisted GPS. Such active approaches may be more time consuming than looking up a previously-obtained location stored in a location database. In order to obtain a location more quickly, the active network location function may, at first, provide only an initial approximation of the client device's location. Later, the active network location function may follow up with a more precise location of the client device. The outbound proxy server may use the initial approximation of the client device's location, inserting the initial approximation into the SIP INVITE message that the outbound proxy server then forwards. To remain in the signaling path, the outbound proxy server may also insert a record route header into the SIP INVITE message. Then, when the outbound proxy server receives a more precise location of the client device from the active network function, the outbound proxy server may send a follow-up message with the more precise location.

In some cases, the outbound proxy server may be unable to obtain a specific location for the client device from the access network. This may occur when the source IP address of the SIP INVITE message is not the client device's actual IP address, for example, because the client device is using Network Address Translation (NAT) or because the client device is communicating via a Virtual Private Network (VPN). In such cases, the source IP address of the SIP INVITE message might not be listed in the location database at all. Alternatively, the location database might list only a generic location for the source IP address, e.g., a location describing the entire area served by the access network, rather than a specific location. Such a generic location might be useful to determine which PSAP should answer the call, but might not be useful for dispatching assistance to the caller.

However, the client device may itself provide location information. For example, the client device could be manually provisioned with information regarding its location. If the client device is mobile, however, this client-provided location information might not be reliable. On the other hand, the client device might use a wireless positioning technology such as the Global Positioning System (GPS) to determine its position. A GPS-based position might be reliable, provided that it is current. Thus, in an exemplary embodiment, a network-provided location may be compared to a client-provided location to obtain a more reliable estimation of the client device's location than could be obtained from a single source of location information.

The evaluation of the network-provided location, if any, and the client-provided location, if any, could be performed by the outbound proxy server. However, in an exemplary embodiment, the outbound proxy server simply inserts the network-provided location into the SIP INVITE message and forwards the modified SIP INVITE message to an emergency services routing server. The emergency services routing server then determines which PSAP should receive the call based on any network-provided location and/or any client-provided location included in the message.

In an exemplary embodiment, the network-provided location may be identified as such in the SIP INVITE message. For example, the outbound proxy server may insert the network-provided location into a designated network-provided location field of the message. In so doing, the outbound proxy server may leave undisturbed any client-provided location that was already included in the message. For example, the client-provided location may be included in a client-provided location field that is separate from the network-provided location field. One benefit of retaining the client-provided location in the message is that if routing based on the network-provided location is incorrect, then the call could be re-routed based on the client-provided location.

In some cases, the outbound proxy server may receive a SIP INVITE message that already contains a network-provided location in a network-provided location field. This may occur, for example, when the client device is communicating via a private network that uses NAT. In particular, the private network may have its own outbound proxy server that inserts private network-provided locations into SIP INVITE messages that request emergency services calls. The private network's outbound proxy might obtain a private network-provided location from a private network location database, e.g., based on a client device's private network address. This approach can beneficially provide a more specific location for the client device than might be obtainable based on the client device's public IP address. Thus, when the outbound proxy server of the access network receives a SIP INVITE message that already contains a network-provided location, the outbound proxy server may retain this location rather than insert a location provided by the access network.

An emergency services routing server may then receive the SIP INVITE message from the outbound proxy server of the access network. At this point, the SIP INVITE message might contain both a network-provided location and a client-provided location. The routing server may evaluate the network-provided location and the client-provided to obtain a best estimate of the client device's location. The evaluation may involve determining whether the network-provided and client-provided locations are consistent, determining which location is more specific, and/or which location is more reliable. As a result of the evaluation, the routing server might use either the network-provided location or the client-provided location as the best estimate of the client device's location, or the routing server might combine the locations to develop its own best estimate of the client device's location. For example, if the network-provided location and client-provided location define distinct but overlapping areas based on their uncertainties, then the client device may be assumed to be located in the area of overlap.

In this regard, the emergency services routing server may apply an uncertainty model to the network-provided location and/or client-provided location in order to estimate the uncertainties of these locations. The uncertainty model that is applied may depend on the type and implementation of the technology that was used to obtain the location. For example, a location that was obtained based on the fact that the client device is communicating via a particular wireless access point may depend on how precisely the location of the wireless access point is known (e.g., based on a wiring diagram) and on the effective communication range of the wireless access point (e.g., a 100 meter radius for an 802.11 wireless access point that is located indoors). The emergency services routing server may determine which uncertainty model to apply based on one or more parameters included with the network-provided location and/or client-provided location in the SIP INVITE message. Alternatively, the SIP INVITE message may include an actual uncertainty for the network-provided location and/or client-provided location.

Once the routing server determines the best estimate of the client device's location, the routing server uses that location to determine which PSAP is appropriate for answering the call. For example, the routing server may access a PSAP coverage database that specifies which PSAPs serve which areas. To route the SIP INVITE message so that the emergency services call will be established to the appropriate PSAP, the routing server may replace the emergency services URI in the message with a URI that corresponds to the PSAP determined to be appropriate to answer the call. To determine PSAP URIs, the routing server may access a PSAP routing database.

In this way, the emergency services call can be established to the PSAP that serves the area in which the client device is located. Moreover, the PSAP may receive both a network-provided location and a client-provided location in the signaling used to set up the call. The PSAP may use one or more of these locations to determine where to dispatch emergency services. In addition, if the PSAP that answers the call is not appropriate, then the location information may be used to re-route the call to another PSAP.

2. Exemplary Network Architecture

Figure 1:
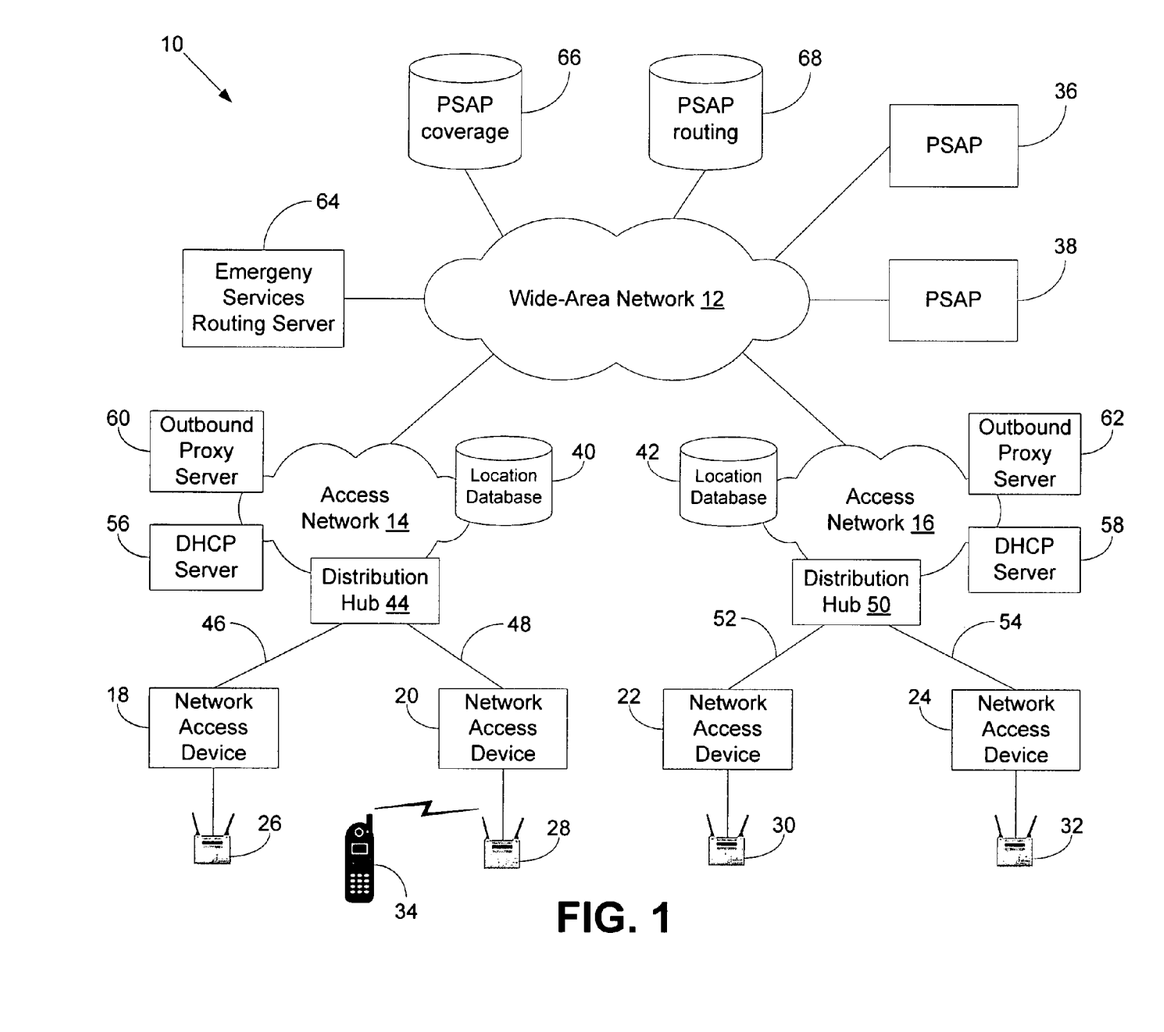
FIG. 1 is a simplified block diagram of a telecommunications network, in accordance with an exemplary embodiment of the present invention.

Referring to the drawings, FIG. 1 is a simplified block diagram of an exemplary telecommunications network 10. Network 10 includes a wide-area network 12, which is communicatively coupled to a plurality of access networks, such as access network 14 and access network 16. For example, wide-area network 12 may correspond to the Internet, and access networks 14 and 16 may correspond to networks operated by two different ISPs to provide access to the Internet. Although FIG. 1 shows only two access networks, it is to be understood that wide-area network 12 could be coupled to many more access networks.

In an exemplary embodiment, networks 12, 14, and 16 are packet-switched networks that convey voice or other media in a packetized format. Thus, networks 12, 14, and 16 may route packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. Application layer protocols, such as the Session Initiation Protocol (SIP), may be used to set up and control voice calls and other communication sessions through networks 12, 14, and 16. Relevant aspects of SIP are described in Rosenberg, et al., "SIP: Session Initiation Protocol," Request for Comments 3261 (June 2002), which is incorporated herein by reference. Networks 12, 14, and 16 may carry the voice or other media in such calls, as UDP/IP or TCP/IP packets, in a real-time packet media format, e.g., by using the real-time transport protocol (RTP). Relevant aspects of RTP are described in Schulzrinne, et al., "RTP: A Transport Protocol for Real-Time Applications," Request for Comments 1889 (January 1996), which is incorporated herein by reference.

Access networks 14 and 16 may be communicatively coupled to network access devices such as DSL modems, cable modems, or routers. For purposes of illustration, FIG. 1 shows access network 14 connected to network access devices 18 and 20 and access network 16 connected to network access devices 22 and 24. It is to be understood, however, that each access network may be connected to many network access devices, which may be distributed over a wide area.

Client devices may, in turn, be able to communicate with network access devices 18, 20, 22, and 24 via either wired or wireless interfaces. For purposes of illustration, FIG. 1 shows network access devices 18, 20, 22, and 24 connected to wireless access points 26, 28, 30, and 32, respectively. In addition, FIG. 1 shows a wireless client device 34 in wireless communication with network access device 20 via wireless access point 28. Thus, at this location, client device 34 is able to access wide-area network 12 via wireless access point 28, network access device 20, and access network 14, for VoP calls and for other types of communication. However, client device 34 may be able to move to other locations where client device can access wide-area network 12, e.g., via a different network access device and/or a different access network. For example, client device 34 may move out of the wireless coverage provided by wireless access point 28 and into the wireless coverage area provided by wireless access point 30. At that point, client device 34 may then access wide-area network 12 via wireless access point 30, network access device 22 and access network 16, e.g., for VoP calls.

These different areas may be served by different PSAPs. For example, FIG. 1 shows wide-area network 12 communicatively coupled to PSAPs 36 and 38. PSAPs 36 and 38 may each include an answering center that answers emergency services calls, such as 9-1-1 calls, on behalf of a public safety organization. Such public safety organizations may include, for example, law enforcement, fire protection, and/or medical assistance organizations. However, a public safety organization may provide services in only a particular geographic area (e.g., a particular city, town, county, or metropolitan area) or in only a particular type of location (e.g., in a particular airport). For example, PSAP 36 may serve the area in which wireless access point 28 is located, and PSAP 38 may serve the area in which wireless access point 30 is located. This means that emergency services calls originating from wireless access point 28, e.g., from client device 34, should be routed to PSAP 36, rather than to PSAP 38. Similarly, emergency services calls originating from wireless access point 30 should be routed to PSAP 38.

PSAPs 36 and 38 could be directly connected to wide-area network 12, as shown in FIG. 1. However, it is to be understood that one or more of these PSAPs could be indirectly connected to wide-area network 12. For example, a PSAP may be connected to one or more circuit-switched elements, such as in the public switched telephone network (PSTN), which, in turn, may be communicatively coupled to wide-area network 12 via a media gateway that converts between packet-switched and circuit-switched media formats. In addition, although FIG. 1 shows only two PSAPs, wide-area network 12 could be communicatively coupled to any number of PSAPs.

To facilitate the routing of emergency services calls to the appropriate PSAPs, and to provide location information that the appropriate PSAP can use for dispatch purposes, access networks 14 and 16 may maintain the locations of client devices, for example, stored in location databases 40 and 42. An access network may determine the locations of client devices based on the locations of hardware elements that the client devices use to access the access network. In this regard, a network access device may be connected to an access network via different types of physical links. At least part of the physical link may include a hardware element in a fixed location, such as an optical fiber, coaxial cable, or telephone line. Thus, FIG. 1 shows network access devices 18 and 20 connected to a distribution hub 44 of access network 14 via physical links 46 and 48, respectively, and shows network access devices 22 and 24 connected to a distribution hub 50 of access network 16 via physical links 52 and 54, respectively. In the case that the network access devices are cable modems, these distribution hubs could be cable modem termination systems (CMTSs). In the case that the network access devices are DSL modems, the distribution hubs could be digital subscriber line access multiplexers (DSLAMs).

Each of physical links 46, 48, 52, and 54 may be connected to a single network access device or to a group of proximately-located network access devices. As a result, the general location of a client device can be determined by identifying the physical link that a client device is using for communication. The identification of the physical link that a client device is using may be made when the client device logs into the access network. For example, access networks 14 and 16 may include respective DHCP servers 56 and 58 that dynamically assign IP addresses to client devices when they log on. As part of the DHCP process, the distribution hub may inform the DHCP server of which physical link the client device is using. The distribution hub may identify the physical link, for example, as a particular circuit or port. The DHCP server may then push the physical link identification and the IP address assigned to the client device to the location database. The location database may then translate the physical link identification into a location, e.g., a street address where the terminus of the physical link is located.

For example, if client device 34 logs into access network 14 via network access device 20 using DSL, then distribution hub 44 may identify physical link 48 as corresponding to a telephone line that goes to the premises where network access device 20 is located. DHCP server 56 may dynamically assign an IP address to client device 34 and then push the IP address and physical link identification to location database 40. Location database 40 may then translate the physical link identification into the street address of the premises at which physical link 48 terminates. Location database to may store a correlation between this street address and the IP address assigned to client device 34.

Access networks 14 and 16 include outbound proxy servers 60 and 62, respectively. Outbound proxy servers 60 and 62 receive all initial VoP call requests, e.g., SIP INVITE messages, from client devices coupled to their respective access networks in order to determine whether the VoP call requests are requesting emergency services calls. For example, when outbound proxy server 60 determines that an emergency services call is being requested, it may identify the source IP address contained in the request message and obtain the location information that is correlated with that source IP address in location database 40. Outbound proxy server 60 may then insert this network-provided location information into the request message and forward the modified message to an emergency services routing server 64.

In an exemplary embodiment, emergency services routing server 64 receives messages forwarded from multiple access networks, for example, from outbound proxy server 60 in access network 14 and from outbound proxy server 62 in access network 16. As described in more detail below, routing server 64 then evaluates the location information provided in the message that it receives to determine how to route the message so that the emergency services call will be established to the appropriate PSAP. In this regard, routing server 64 may formulate a best estimate of the caller's location and then access a PSAP coverage database 66 to determine which PSAP serves this location. Routing server 64 may then access a routing database 68 to obtain a routing a routing address that can be used to route the call to the appropriate PSAP. Alternatively, PSAP coverage database 66 may itself provide PSAP routing addresses.

Although FIG. 1 shows a routing server separate from the outbound proxy servers, in some embodiments, the outbound proxy servers may also function as routing servers. In addition, although FIG. 1 shows various databases as being separate from the servers that access them, the database could be integrated with the servers. Thus, location database 40 could be integrated with outbound proxy server 60, and location database 42 could be integrated with outbound proxy server 62. Similarly, PSAP coverage database 66 and/or PSAP routing database 68 could be integrated with routing server 64.

3. Exemplary Operation

FIGS. 2-5 are flow charts illustrating steps of an exemplary method of operation. In this exemplary operation, SIP is the signaling protocol that the client device uses to set up calls. However, it is to be understood that SIP is exemplary only; other signaling protocols could be used. In addition, FIGS. 2-5 assume the network architecture shown in FIG. 1, though it is to be understood that other network architectures could be used.

Figure 2:
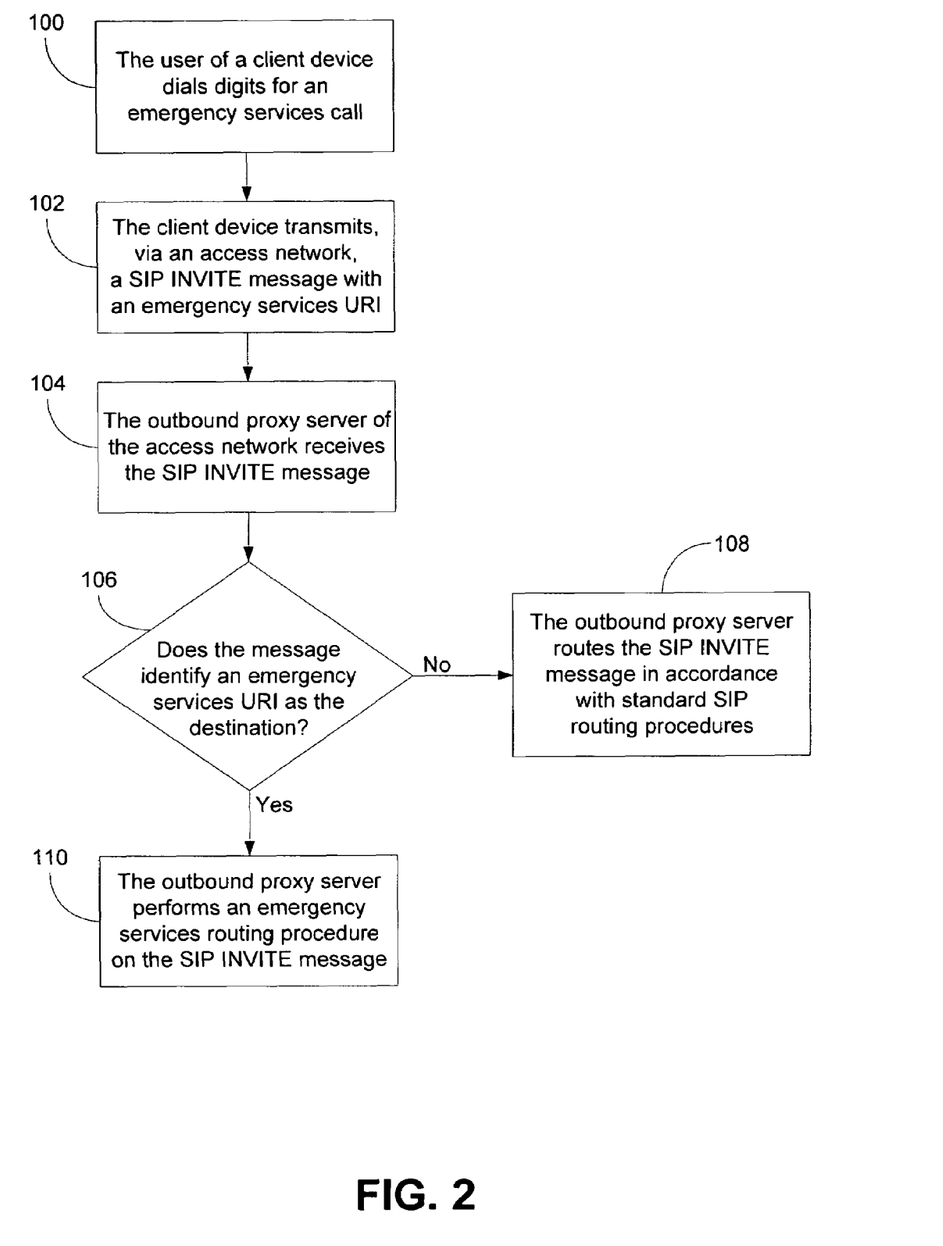
FIG. 2 is a flow chart illustrating a first part of a method for routing a voice-over-packet emergency services call to an appropriate PSAP, in accordance with an exemplary embodiment of the present invention.

With reference to FIG. 2, the process may begin when the user of a client device dials digits for an emergency services call, as indicated by block 100. The particular digits that the user dials may depend on the jurisdiction in which the user is located. For example, in many parts of the United States, an emergency services call can be placed by dialing "911." In other areas, particularly outside of the United States, other digits may be used to place emergency services calls. However, the dialed digits may indicate an emergency services call without specifying which particular PSAP should answer the call. For example, there are many PSAPs in the United States that answer 9-1-1 calls.

In response to these dialed digits, the client device transmits, via an access network, a SIP INVITE message with an emergency services URI in a destination field, as indicated by block 102. The emergency services URI may include the digits that the user dialed, e.g., "911." Alternatively, the emergency services URI may include a designation other than the dialed digits to indicate that an emergency services call is being requested. For example, the emergency services URI may include an "sos" designation that could be used to indicate an emergency services call independently of the particular digits the user dialed. As noted above, such emergency services URIs indicate that an emergency services call is requested without specifying which particular PSAP should answer the call. In still other cases, the SIP INVITE message may include other types of information to indicate that the client device is requesting establishment of an emergency services call.

The outbound proxy server of the access network receives the SIP INVITE message, as indicated by block 104. For example, with reference to FIG. 1, client device 34 may transmit the SIP INVITE message via wireless access point 20, in which case outbound proxy server 60 would received receive the message via access network 14. In some cases, the client device may specifically direct the SIP INVITE message to the outbound proxy server, e.g., because the client device has been configured to use the outbound proxy server for all initial call requests. In other cases, the access network, rather than the client device, may direct the SIP INVITE message to the outbound proxy server, e.g., using policy-based routing.

The outbound proxy server then determines whether the SIP INVITE message is requesting an emergency services call, e.g., by checking the destination field for an emergency services URI, as indicated by block 106. If the SIP INVITE message is not requesting an emergency services call, then the outbound proxy server may route the message in accordance with standard SIP routing procedures, as indicated by block 108. In this case, however, the SIP INVITE message contains is requesting an emergency services call. As a result, the outbound proxy server performs an emergency services routing procedure on the SIP INVITE message, as indicated by block 110.

Figure 3:
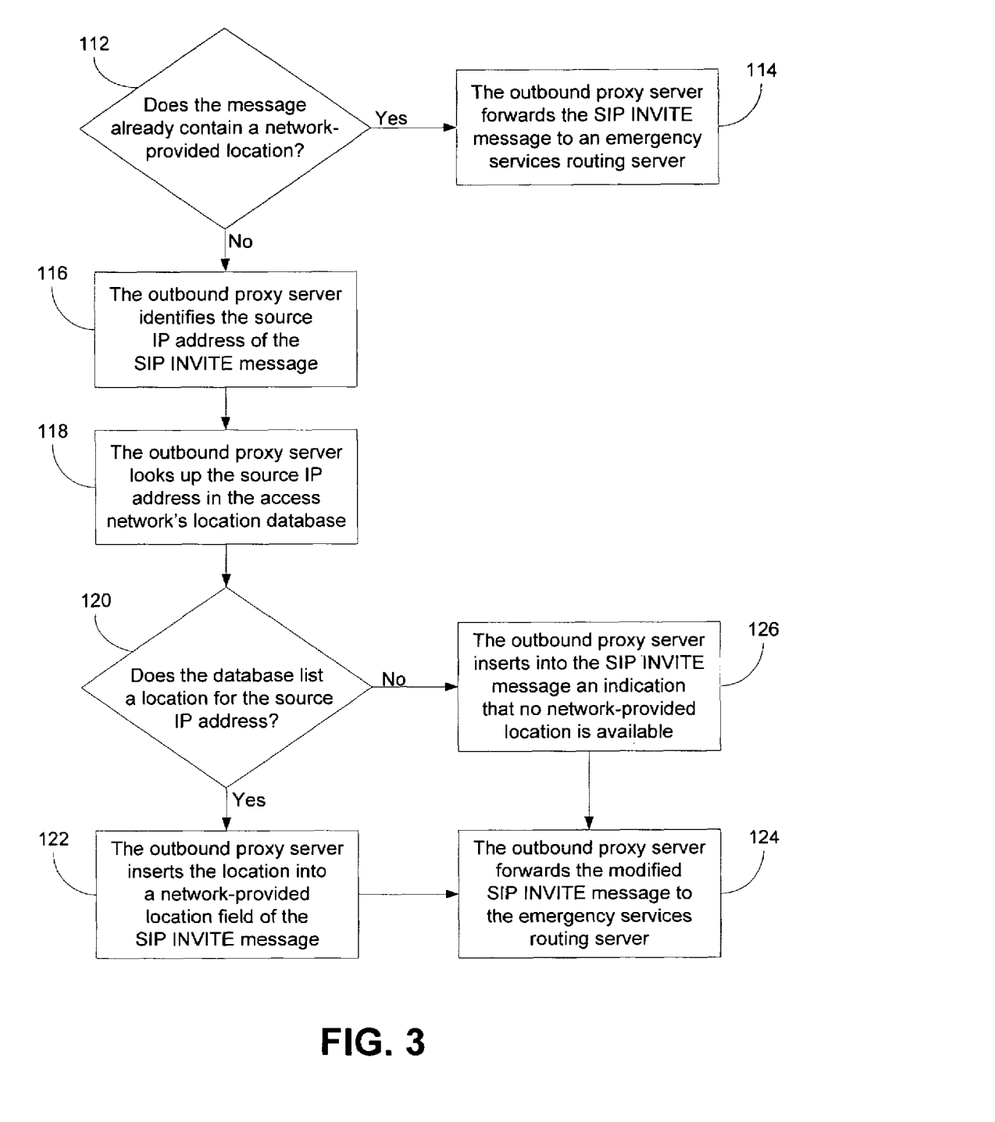
FIG. 3 is a flow chart illustrating a second part of a method for routing a voice-over-packet emergency services call to an appropriate PSAP, in accordance with an exemplary embodiment of the present invention.

FIG. 3, illustrates the steps taken by the outbound proxy server for a SIP INVITE message that requests an emergency services call. The outbound proxy server may first examine the SIP INVITE message to determine whether the message already contains a network-provided location, as indicated by block 112. This may occur, for example, when an outbound proxy server in a private network inserts a network-provided location into the SIP INVITE message before the message reaches the access network. A private network may have more specific information regarding a client device's location than the access network, because the access network may see only the client device's public address. Thus, a location provided by a private network may be retained as being more reliable than a location provided by the access network. Following this approach, when the SIP INVITE message already contains a network-provided location, the outbound proxy server may simply forward a SIP INVITE message to an emergency services routing server without inserting any additional location information, as indicated by block 114.

However, when the SIP INVITE message does not contain a network-provided location, the outbound proxy server may try to obtain a location of the client device from the access network. To do this, the outbound proxy server may identify the source IP address of the SIP INVITE message, as indicated by block 116. The outbound proxy server may then look up the source IP address in the access network's location database, as indicated by block 118. Whether this approach is successful may depend on whether the location database lists a location for the source IP address, as indicated by block 120.

If the outbound proxy server is able to obtain a location from the location database based on the source IP address, then the outbound proxy server inserts the location into a network-provided location field of the SIP INVITE message, as indicated by block 122. The outbound proxy server then forwards the modified SIP INVITE message to an emergency services routing server, as indicated by block 124.

The network-provided location field may be identified by a predefined header, which the outbound proxy server may also insert into the SIP INVITE message. By placing the location in a network-provided location field, the location can be tagged as having been provided by the access network and can be distinguished from any client-provided location that may also be included in the SIP INVITE message. In this regard, some client devices may be configured to include a location in any SIP INVITE message that is transmitted to request an emergency services call. Such client-provided location may be more or less reliable, e.g., depending on how it is obtained. For example, a manually provisioned location may not be reliable if the client device has moved. However, a GPS-derived location, if current, may be reliable. In any event, because the client-provided location can sometimes be reliable, it is preferable to retain it. Thus, the outbound proxy server preferably leaves undisturbed any client-provided location when inserting the network-provided location into the SIP INVITE message.

If, however, the location database does not list a location for the source IP address, the outbound proxy server may insert an indication into the SIP INVITE message that no network-provided location is available, as indicated by block 126. For example, the outbound proxy server may insert text such as "network-derived location information unavailable" into a network-provided location field. A network-provided location may be unavailable for any number of reasons. In some cases, the location database may simply not be current. In other cases, the client device may be communicating in such a way, e.g., through a VPN, that the client device's actual IP address is hidden.

Although FIG. 3 illustrates an example in which the outbound proxy server obtains a network-provided location of the client device by querying a location database, it is to be understood that the outbound proxy could obtain the network-provided location in other ways. For example, the outbound proxy server could, in response to determining that the SIP INVITE message is requesting an emergency services call but does not already contain a network-provided location, invoke an active network function of the access network. The outbound proxy server may insert into the SIP INVITE message an initial approximation of the client device's location that is obtained from the active network location function and then forward the SIP INVITE message to the emergency services routing server. The active network location function may later provide a more precise location, which the outbound proxy server may then forward to the emergency services routing server in a subsequent message.

Figure 4:
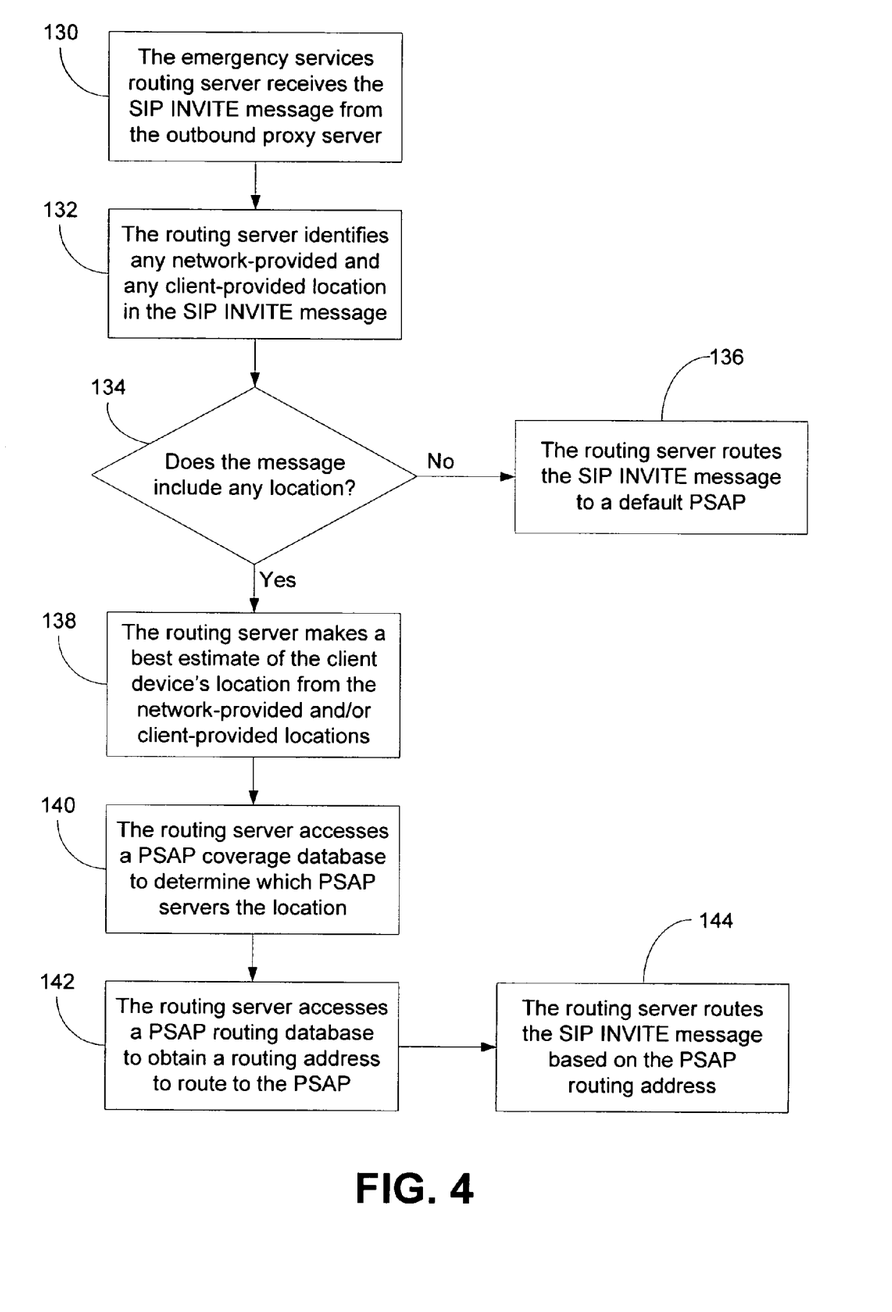
FIG. 4 is a flow chart illustrating a second part of a method for routing a voice-over-packet emergency services call to an appropriate PSAP, in accordance with an exemplary embodiment of the present invention.

FIG. 4 illustrates the steps that may be performed by the emergency services routing server to route the emergency services call to the appropriate PSAP. As indicated by block 130, the emergency services routing server receives the SIP INVITE message from the outbound proxy server. The emergency services routing server then identifies any network-provided location and any client-provided location that may be included in the SIP INVITE message, as indicated by block 132. How the emergency services routing server proceeds depends on whether the SIP INVITE message includes any location for the client device, whether provided by the network or the client, as indicated by block 134. If the message does not any client device location, then the emergency services routing server may route the SIP INVITE message to a default PSAP, as indicated by block 136. The default PSAP could be based, for example, on the identity of the outbound proxy server that sent the SIP INVITE message or on the source IP address of the message. Although this information might not pinpoint the location of the client device, the information may nonetheless indicate a general geographic area, such as a particular metropolitan area, that suggests an appropriate PSAP.

On the other hand, if the SIP INVITE message includes a network-provided location and/or client-provided location, then the emergency services routing server makes a best estimate of the client device's location based on the network-provided location and/or client-provided location, as indicated by block 138. Once the emergency services routing server has determined a best estimate of the client device's location, the routing server may access a PSAP coverage base to determine which PSAP serves that location, as indicated by block 140. The PSAP that serves that location will typically be the PSAP that is appropriate to receive the emergency services call. Thus, the emergency services routing server will route the SIP INVITE message so that the emergency services call will be established to that PSAP. To do this, the emergency services routing server may access a PSAP routing database to obtain a routing address that can be used to route the SIP INVITE message to the appropriate PSAP, as indicated by block 142. The emergency services routing server then routes the SIP INVITE message based on the PSAP routing address, as indicated by block 144. To do this, the emergency services routing server may replace the emergency services URI with a PSAP URI that corresponds to the appropriate PSAP and then route the SIP INVITE message in accordance with standard SIP routing procedures.

In this way, the emergency services call can be established to the appropriate PSAP. Moreover, the PSAP may learn the caller's location from the location information included in the call set-up signaling. With this location information, the PSAP may be able to dispatch timely assistance to the caller.

Although FIGS. 2-4 illustrate an example in which various steps are performed by the outbound proxy server of the access network being used by the client device and various steps are performed by an emergency services routing server, which may server multiple access networks, it is to be understood that these steps could be distributed among a greater or fewer number of network elements. For example, the outbound proxy server might be configured to perform the steps of the emergency services routing server, i.e., steps illustrated in FIG. 4.

Figure 5:
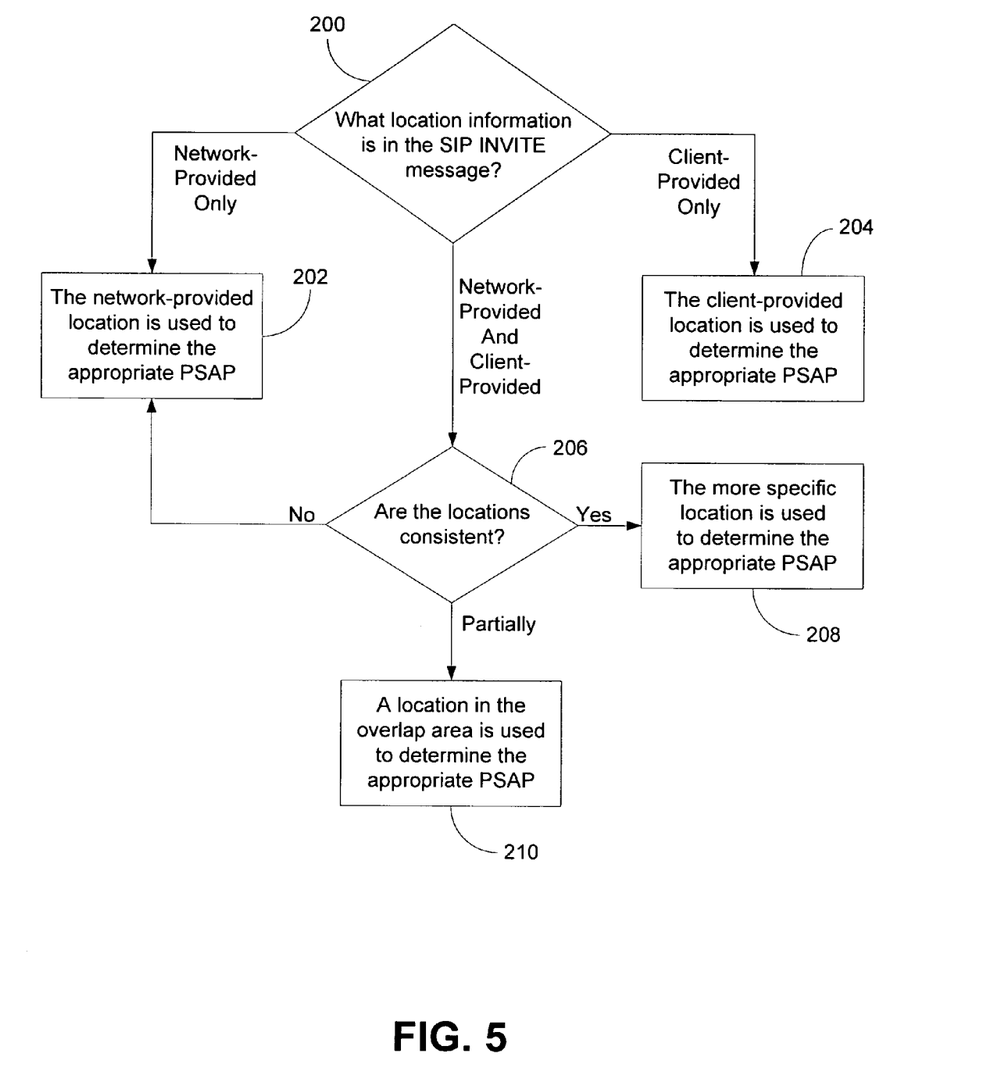
FIG. 5 is a flow chart illustrating an algorithm for determining a best estimate of a client device's location for purposes of determining an appropriate PSAP, in accordance with an exemplary embodiment of the present invention.

FIG. 5 is a flow chart illustrating an exemplary algorithm for determining a best estimate of the client device's location for purposes of determining the appropriate PSAP. Thus, if an emergency services routing server determines a best estimate of the client device's location for purposes of determining the appropriate PSAP, e.g., as in block 138 of FIG. 4, then the emergency services routing server may apply this algorithm. Alternatively, the outbound proxy server of the client device's access network, or some other network element, may apply this algorithm.

In accordance with this exemplary algorithm, the first step might be to determine what location information is included in the SIP INVITE message, as indicated by block 200. If there is only a network-provided location, then the network-provided location is used to determine the appropriate PSAP, as indicated by block 202. If there is only a client-provided location, then the client-provided location is used to determine the appropriate PSAP, as indicated by block 204.

However, if the SIP INVITE message includes both network-provided location and a client-provided location, then the algorithm may determine whether these locations are consistent, as indicated by block 206. To determine whether the network-provided and client-provided locations are consistent, partially consistent, or inconsistent, the emergency services routing server may apply uncertainty models to estimate the uncertainties of these locations. Alternatively, the SIP INVITE message may already include uncertainties for the network-provided location and/or client-provided location.

If the network-provided and client-provided locations are consistent, then the more specific location is used to determine the appropriate PSAP, as indicated by block 208. On the other hand, if the network-provided and client-provided locations are not consistent, then one of the two locations may be deemed to be more reliable based on various considerations. In an exemplary embodiment, the network-provided location may be deemed to be more reliable, and, thus, used to determine the appropriate PSAP, as indicated by block 202. This approach is based on the view that the client-provided location may have been manually configured, whereas the network-provided location may be determined automatically.

In some cases, the network-provided location and client-provided location may be deemed to be partially consistent. This may occur, for example, when the uncertainties in the two locations define different but overlapping areas in which the client device could be located. In such cases, a location in the overlap area could be used to determine the appropriate PSAP, as indicated by block 210.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for emergency services call routing, said method comprising:
   receiving from a client device, via a voice-over-packet (VoP) access network, a message requesting an emergency services call, said message including a client-provided location of said client device;
   obtaining from said VoP access network a network-provided location of said client device;
   determining whether said network-provided location and said client-provided location are consistent;
   determining an appropriate public safety answering point (PSAP), from among a plurality of PSAPs, based on at least one of said network-provided location and said client-provided location; and
   routing said emergency services call to said appropriate PSAP.

2. The method of claim 1, wherein said emergency services call is a 9-1-1 call.

3. The method of claim 1, wherein said message is a Session Initiation Protocol (SIP) INVITE message.

4. The method of claim 1, wherein obtaining from said VoP access network a network-provided location of said client device comprises:
   accessing a location database of said VoP access network to obtain said network-provided location.

5. The method of claim 4, wherein said message includes a source address and wherein said location database correlates locations of client devices with source addresses.

6. The method of claim 5, wherein accessing a location database of said VoP access network to obtain said network-provided location comprises:
   identifying a location that is correlated in said location database with said source address.

7. The method of claim 6, wherein said source address is an Internet Protocol (IP) address.

8. The method of claim 1, further comprising:
   inserting said network-provided location into said message.

9. The method of claim 1, wherein determining an appropriate public safety answering point (PSAP), from among a plurality of PSAPs, based on at least one of said network-provided location and said client-provided location comprises:
   determining that said network-provided location and said client-provided location are consistent; and
   determining which of said network-provided and client-provided locations is more specific.

10. The method of claim 9, wherein determining an appropriate public safety answering point (PSAP), from among a plurality of PSAPs, based on at least one of said network-provided location and said client-provided location comprises:
    determining that said network-provided location is more specific; and
    identifying said appropriate PSAP based on said network-provided location.

11. The method of claim 9, wherein determining an appropriate public safety answering point (PSAP), from among a plurality of PSAPs, based on at least one of said network-provided location and said client-provided location comprises:
    determining that said client-provided location is more specific; and
    identifying said appropriate PSAP based on said client-provided location.

12. The method of claim 1, wherein determining an appropriate public safety answering point (PSAP), from among a plurality of PSAPs, based on at least one of said network-provided location and said client-provided location comprises:
    determining that said network-provided location and said client-provided location are inconsistent; and
    identifying said appropriate PSAP based on said network-provided location.

13. The method of claim 1, wherein obtaining from said VoP access network a network-provided location of said client device comprises:
    invoking an active network location function of said VoP access network to obtain said network-provided location.

14. A method for providing location information for emergency services calls, said method comprising:
    a client device logging into a voice-over-packet (VoP) access network via a physical link;
    dynamically assigning a network address to said client device;

storing in a location database a correlation between said network address and a location associated with said physical link;

an outbound proxy server receiving from said client device, via said VoP access network, a Session Initiation Protocol (SIP) INVITE message, said SIP INVITE message including said network address;

said outbound proxy server determining that said SIP INVITE message is requesting an emergency services call and, responsively, accessing said location database to obtain said location based on said network address; and said outbound proxy server inserting said location into said SIP INVITE message as a network-provided location.

15. The method of claim 14, wherein determining that said SIP INVITE message is requesting an emergency services call comprises:

determining that said SIP INVITE message contains an emergency services URI.

16. The method of claim 15, wherein said SIP INVITE message contains a client-provided location, further comprising:

determining an appropriate public safety answering point (PSAP), from among a plurality of PSAPs, based on at least one of said network-provided location and said client-provided location; and replacing said emergency services URI with a PSAP URI corresponding to said appropriate PSAP.

17. The method of claim 14, further comprising:

said VoP access network diverting said SIP INVITE message to said outbound proxy server.

18. A system for providing location information for emergency services calls, said system comprising:

a voice-over-packet (VoP) access network to which a plurality of client devices are communicatively coupled;

an outbound proxy server communicatively coupled to said VoP access network so as to receive call requests from said client devices, wherein in response to an emergency services call request from a given one of said client devices said outbound proxy server is configured to (i) obtain a network-provided location of said given client device, based on a source address of said emergency services call request or by invoking an active network location function of said VoP access network, and (ii) insert said network-provided location into said emergency services call request; and a routing server communicatively coupled to said outbound proxy server, wherein said routing server is configured to route said emergency services call request to an appropriate public safety answering point (PSAP), from among a plurality of PSAPs, based on an evaluation of said network-provided location and any client-provided location in said emergency services call request, wherein said evaluation involves determining whether said network-provided location and said any client-provided location are consistent.

19. The system of claim 18, further comprising:

a location database, wherein said location database correlates locations of said client devices with source addresses assigned to said client devices, said outbound proxy server being configured to obtain said network-provided location of said given client device from said location database based on said source address of said emergency services call request.

* * * * *

UNITED STATES PATENT AND TRADEMARK OFFICE
CERTIFICATE OF CORRECTION

PATENT NO.       : 7,602,886 B1                                    Page 1 of 1
APPLICATION NO. : 11/185094
DATED            : October 13, 2009
INVENTOR(S)      : Beech et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Fifth Day of October, 2010

David J. Kappos
*Director of the United States Patent and Trademark Office*